United States Patent [19]
Durbin

[11] Patent Number: 5,143,111
[45] Date of Patent: Sep. 1, 1992

[54] MULTIFLUID FLOW CONTROL UNIT

[76] Inventor: Enoch J. Durbin, 246 Western Way, Princeton, N.J. 08540

[21] Appl. No.: 646,177

[22] Filed: Jan. 28, 1991

[51] Int. Cl.$^5$ .............................................. F02B 43/00
[52] U.S. Cl. .................................... 137/100; 123/527
[58] Field of Search ............... 137/100; 123/440, 527, 123/530, 567

[56] References Cited

U.S. PATENT DOCUMENTS

| | | | |
|---|---|---|---|
| 2,883,996 | 4/1959 | Blewett et al. | 137/100 |
| 3,662,773 | 5/1972 | Nicolas | 137/100 |
| 3,749,111 | 7/1973 | Dobritz | 137/100 |
| 4,148,311 | 4/1979 | London et al. | 137/100 |
| 4,254,789 | 3/1981 | Westberg | 137/100 |
| 4,467,834 | 8/1984 | Rochat et al. | 137/100 |
| 4,479,466 | 10/1984 | Greenway et al. | 123/527 |
| 4,483,303 | 11/1984 | Ishikawa et al. | 123/527 |

*Primary Examiner*—David A. Okonsky
*Attorney, Agent, or Firm*—Venable, Baetjer and Howard

[57] ABSTRACT

A system is described that combines two or more fluids in fixed proportions over a wide range of flow rates, in which said proportions are independent of the rate of flow of the fluids, by causing each of said fluids to experience a drop in pressure which is approximately proportional to said fluid flow. An important application of such a system is to serve as a fuel-oxidizer combiner for a combustion engine to provide a constant ratio of air to fuel over a wide range of engine power output. The invention is especially useful in controlling the ratio of air to natural gas in natural gas fueled engines, where the gas is stored at very high pressures and is normally reduced to atmospheric pressure before being mixed with the air in an air-gas mixer.

10 Claims, 3 Drawing Sheets

MULTIFLUID FLOW CONTROL UNIT

DESCRIPTION OF THE INVENTION

1. Field of the Invention

The present invention relates to apparatus for combining two or more fluids with variable flow rates, in fixed proportions, over a wide range of flow rates. More specifically, when said fluids are fuel and oxidizer supplied to a combustion engine the present invention provides a means for holding constant the air/fuel ratio in such an engine over its total operating range of power output. Although a specific application to the control of air/fuel ratio for a combustion engine is illustrated, it is obvious that the invention described herein can be employed to control the proportionality of other fluids being mixed at various fluid flow rates. An important feature of the invention is that the accuracy requirement of pressure regulators employed in such mixing is considerably lessened, since the pressure drop is made proportional to the flow rate rather than to the square of the flow rate, as is the case when orifices are used to meter the flowing fluids.

2. Background of the Invention

In combustion engines, the level of noxious emissions and efficiency are strongly dependent on the ratio of air to fuel supplied to the engine. In prior art engines air/fuel control systems there are fundamentally two different systems for providing such engines with appropriate air/fuel mixtures.

The first and simplest employs a carburetor with orifice means for reducing the pressure in the incoming air stream. The pressure of the fuel is regulated by pressure regulator means to be at atmospheric pressure. The reduced pressure of the incoming air stream is then applied to a fuel orifice to suck in the fuel by means of the difference in pressure between the reduced pressure of the incoming air stream and the regulated fuel pressure upstream of the orifice.

In a conventional engine for a motor vehicle the ratio of maximum air inflow to minimum air inflow required is typically 30/1. The reduced pressure in the carburetor venturi is proportional to the square of the flow. The ratio of pressure reduction from maximum to minimum flow is thus typically $(30/1)^2$ or 900/1. The maximum air pressure reduction at the maximum flow is typically limited to about 2000 pascals to avoid substantial reduction in the maximum air intake of the engine and, hence in the maximum engine power. This means that the minimum pressure reduction will be about 2000/900 pascals or approximately 2 pascals at the minimum engine power. Therefore, accurate control of air/fuel ratio at low power levels requires that the fuel pressure be maintained at the atmospheric pressure level with an error tolerance which is very small compared to 2 pascals.

Examination of the performance of pressure regulators for both liquid and gaseous fuels at the pressures normally employed in engines shows that the error tolerance is typically greater than 20 pascals and frequently more than 100 pascals. This means that at 10% of full power the air/fuel ratio error in such an engine is typically 100%. Studies of power levels employed in urban and highway driving show that a majority of the time power levels of less than 10% of full power are employed. The simple carburetor, as described herein, requires extensive and complex modification for the engine to be operable at low loads, especially at idling conditions, when concern for noxious emissions becomes important. No modification of the carburetor principle described here seems to be sufficient to achieve low levels of noxious emissions from the engine at these lower engine power levels.

A second method for control of the air/fuel ratio in combustion engines involves the direct measurement of air flow, by a suitable sensor, or by inferring the rate of air flow by indirect methods, involving the measurement of a number of engine parameters, such as engine speed, intake manifold pressure, throttle position, and cooling fluid temperature, among others. The measured or inferred air flow is then typically used to control electromagnetic fuel injectors. This latter system is far more complex and only slightly more accurate than the simple carburetor described above.

What is needed and what is provided by the present invention is a new carburetor, or air/fuel combining concept, that reduces the ratio of pressure reduction, from maximum to minimum flow, from 900/1 to 30/1, thereby increasing the tolerance for pressure regulator error by 30 times, and typically raising the minimum pressure reduction from 2 to 60 pascals. This means that at 10% of full power the air/fuel ratio error is typically reduced from almost 100% to less than 10% when the error tolerance of the pressure regulator is approximately 20 pascals.

This invention is of considerable environmental significance. The inventor has had considerable experience in studying the performance of natural gas powered vehicles. One of the more serious deficiencies of these potentially very clean vehicles is the inability of current air/fuel ratio control systems, for such vehicles, to hold air/fuel ratio constant over the range of output power levels required of such vehicles. Since emissions performance is strongly dependent on air/fuel ratio, none of the current vehicles are able to achieve their low emissions potential. The principle problem is the very severe pressure regulator error requirement. The present invention reduces that problem by a factor of approximately 30.

SUMMARY OF THE INVENTION

In the present invention, two or more flowing fluids are combined in fixed proportions, over a broad range of flow rates, by first equalizing the pressure of each fluid, if not already equal, by means of pressure regulator(s) prior to flow of the individual fluids through an individual porous structure, such porous structure being an interconnected pore or capillary duct structure. The diameter of the pores or of the capillary ducts are selected to be sufficiently small, so that viscous forces in the fluids flowing through the porous structures are larger than the inertial forces in the fluids throughout the desired range of flows of the fluids. Inertial forces in the fluid cause the pressure in a fluid flowing through a restriction to be reduced in proportion to the square of the velocity of the fluid, while viscous force cause the pressure to be reduced in proportion to the velocity of the fluid.

In the present invention, therefore, the range of pressure drop is considerably diminished, thereby reducing the accuracy required in equalizing the pressure of the fluids, prior to their individual flow through the porous structure. After passing through the porous structures the fluids are joined in a common chamber, with a common pressure. Thus, the pressure difference across the porous structure in the path of each flowing fluid is identical. Since the flow of each fluid is proportional to the pressure difference, the flow rate of each fluid is in proportion to one another, and depends only on the fluid pass-through area of the respective porous structures. To adjust the constant of proportionality between the fluids, means are provided to adjust the pass-through area of the porous structures. Reducing the pass-through area reduces the flow rate of the corresponding fluid, thus adjusting the constant of proportionality accordingly.

DETAILED DESCRIPTION OF THE INVENTION

Figure 1:
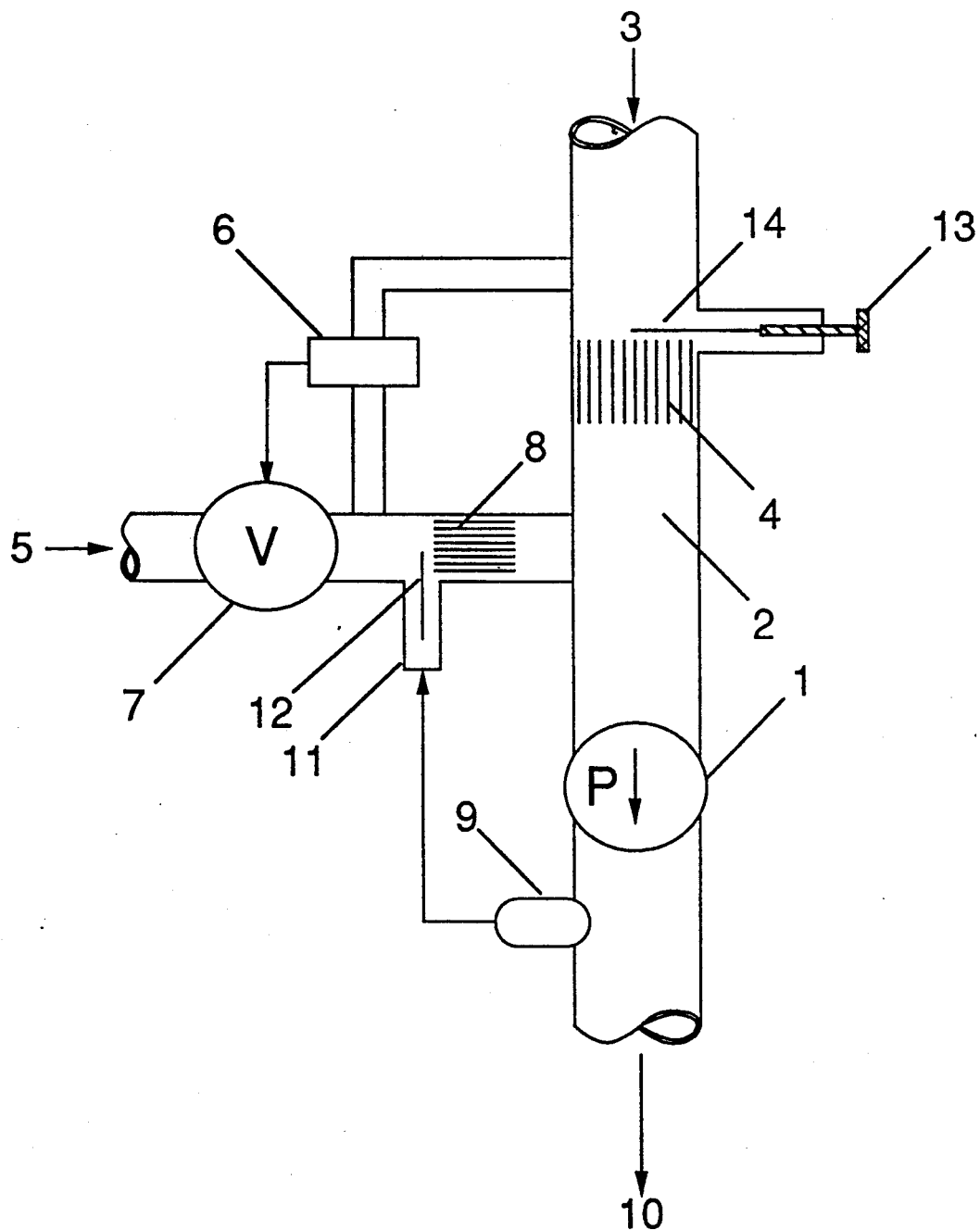
FIG. 1 shows a general embodiment of the invention.

The elements of the general embodiment of the invention are shown in FIG. 1. Two or more fluids (in the figure two fluids are indicated) are both drawn together by means of a suction pump (1), which can provide a variable rate of flow, into a common chamber (2) where said fluids are joined. The first fluid (3) is drawn past a porous structure (4) into the common chamber (2). A second fluid (5) is also drawn past a porous structure (8). The pore diameters of the porous structures are chosen to be sufficiently small so that the viscous forces in the fluids (3,5) flowing through their respective porous structures (4,8) are larger than the inertial forces in the fluids. Thus, the pressures in the fluids (3,5) in passing through their respective porous structures (4,8) are reduced in proportion to the flow rates of the fluids. A means for equalizing the pressure of a first fluid (3) and a second fluid (5) is provided by a differential pressure sensor (6) which senses the differential pressure between fluids (3,5) upstream of their respective porous structures (4,8). The output of the sensor (6) is used to adjust a valve (7) to equalize the pressure of a second fluid (5), upstream of its porous structure (8), with that of the first fluid (3), upstream of the first porous structure (4). Since the pressure drop across the second porous structure (8) and the first porous structure (4) are thereby made equal under all flow conditions, the flow rate of the two fluids (5,3) will be proportionate to one another. Further, the ratio of pressure drop at maximum flow to pressure drop at minimum flow will be the same as the ratio of the maximum flow rate to the minimum flow rate.

A sensor (9) of the proportions of the fluids (3,5) in the combined fluids (10) is used to signal the shutter control means (11) to adjust the shutter (12), which blocks a portion of the fluid pass-through area of the second porous structure (8), thereby adjusting the proportionality ratio of the fluids (5,3) to a predetermined ratio.

The shutter control means (13) is used to select the position of the shutter (14) to provide the maximum allowed pressure drop across the first porous structure (4) at the maximum flow.

Figure 2:
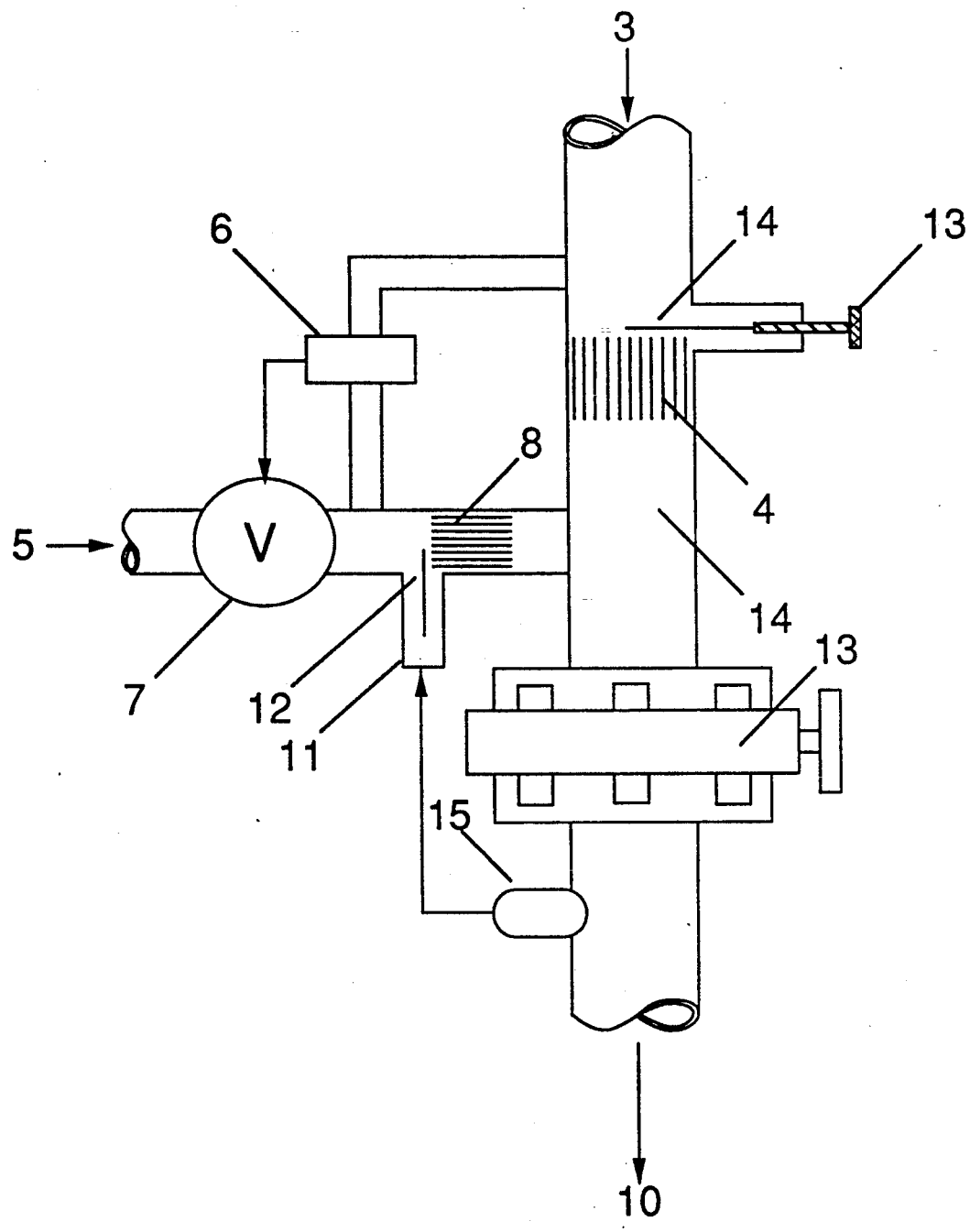
FIG. 2 shows the application of the invention to automatically regulate air/fuel ratio in a combustion engine.

In FIG. 2, the suction pump (1) is shown to be a combustion engine (13) and the first fluid (3) is air while the second fluid (5) is a fuel. The common chamber (2) is the intake manifold (14) of said combustion engine. The sensor of fluid proportionality (9) is an oxygen sensor (15) in the exhaust of said combustion engine (13) and is an indicator of the ratio of air to fuel. In this instance, the shutter (14) is adjusted to provide the maximum allowable pressure drop at the maximum air flow rate, to result in the maximum allowable power loss in said combustion engine.

Figure 3:
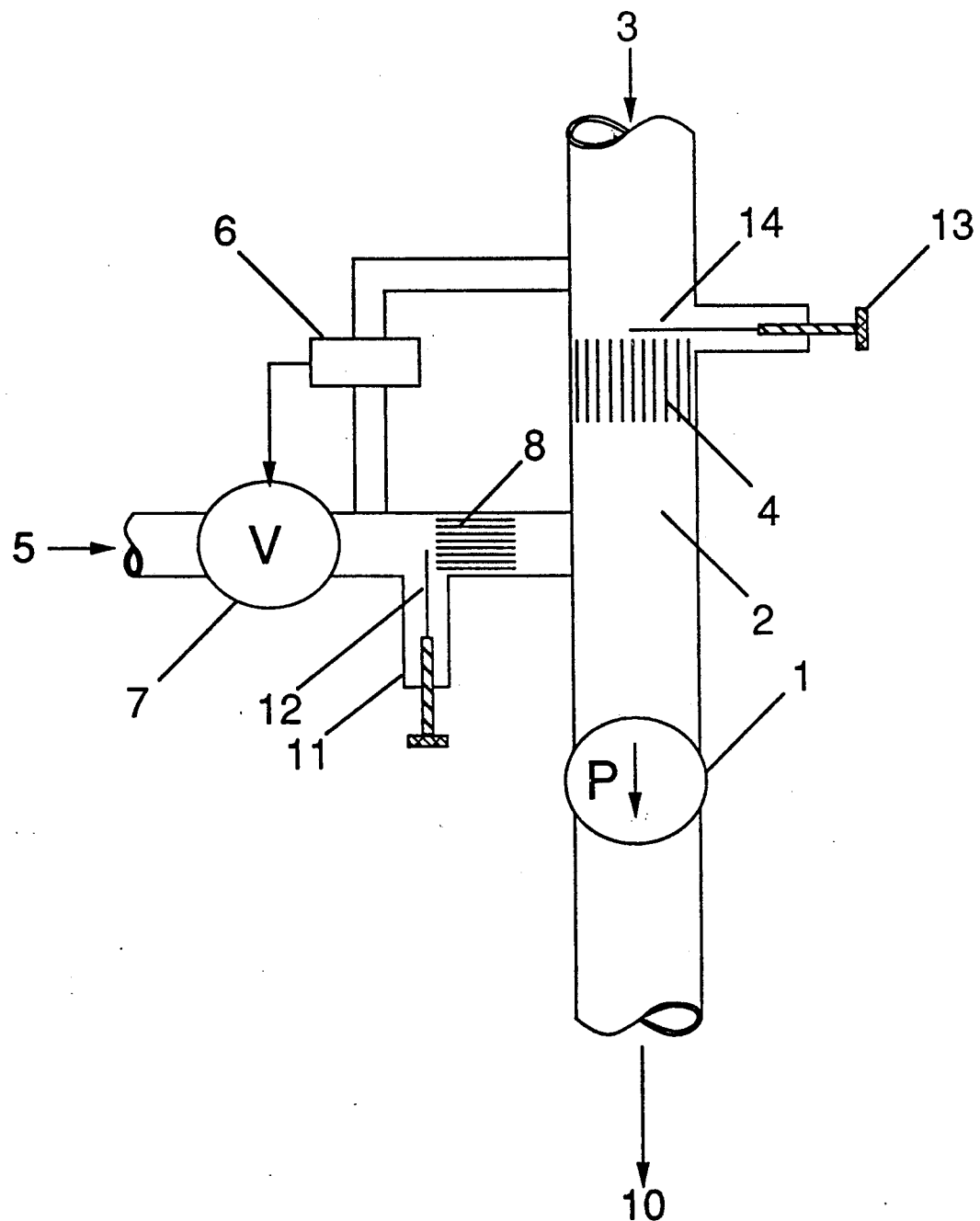
FIG. 3 shows a configuration wherein the ratio of fluid proportionality is manually adjustable.

In FIG. 3, the shutter control means (11) is manually adjusted without the use of an additional sensor (9) and the system is used to fix the air/fuel ratio under the condition of variable flow at any predetermined level.

I claim:

1. Apparatus for combining two or more flowing fluids in fixed proportions wherein each fluid is separately caused to flow through porous structures with a pore diameter sufficiently small so that viscous forces in the fluid flowing through said porous structure are larger than inertial forces in the fluid over the desired range of flows, additionally comprising a common chamber downstream of said porous structures wherein said flowing fluids are joined.

2. Apparatus as in claim 1 wherein said porous structure consists of one or more capillary ducts.

3. Apparatus as in claim 1 wherein said porous structure consists of an interconnected pores porous substance.

4. Apparatus as in claim 1 wherein one of said fluids is a combustible fuel and another is an oxidizer for said fuel.

5. Apparatus as in claim 4 wherein said fluids are supplied to a combustion engine.

6. Apparatus as in claim 1 additionally comprising means for equalizing the pressures of said fluids prior to the flow of each fluid through said porous structures.

7. Apparatus as in claim 6 additionally comprising a shutter means for adjustment of the fluid pass-through area of said porous structures.

8. Apparatus as in claim 7 additionally comprising sensing means of said fixed fluid proportions to adjust said shutter means in accordance with the fluid mixture proportions.

9. Apparatus as in claim 8 wherein said fluids are fuel and oxidizer for said fuel, and wherein said fluids are supplied to a combustion engine.

10. Apparatus as in claim 9 wherein said sensing means is an oxygen sensor in the exhaust of said combustion engine.

* * * * *